3,554,961
IODINE, CHLORINE OR BROMINE STABILIZED OLEFIN POLYMERS
Clive D. Moon, Bartlesville, Okla., assignor to Phillips Petroleum Company, a corporation of Delaware
No Drawing. Filed Oct. 7, 1968, Ser. No. 765,660
Int. Cl. C08f 45/56
U.S. Cl. 260—45.7          4 Claims

ABSTRACT OF THE DISCLOSURE

Olefin polymers are stabilized to minimize melt flow drop off at elevated temperatures by admixing the polymer with 0.004 to 0.5 weight percent of elementary iodine, chlorine or bromine, resulting in improved processability.

---

This invention relates to a method for stabilizing olefin polymers. In another aspect, this invention relates to olefin polymers which are stabilized against melt flow drop off at elevated temperature.

Normally, polymers and other plastic materials prepared from olefins are processed by heating the material to a temperature level where they become molten and then shaping the molten polymer into the desired form by various techniques such as extruding, injection molding, blow molding and other types of thermoforming. At these high temperatures, many polymers demonstrate a melt flow drop off which causes problems in the production of the polymer, as well as in fabrication. For example, the times for various molding processes are increased because of the longer time required by the less fluid polymer to fill the molds.

Briefly, melt flow is the amount, in grams for ten minutes, of a resin that can be forced through an orifice, when subjected to a given force at a given temperature. Melt flow drop off is a decrease in the melt flow from time interval to time interval, usually reaching a relatively constant melt flow. Naturally, if the drop off is too great, the resin will cease to flow or flow slowly, resulting in the above-mentioned problems.

The polymer is often processed into pellets by extrusion techniques. A melt flow drop off during this processing results in flow characteristic changes which can limit the potential applications for the processed polymer. Also, in applications where clearness is desired, e.g. film manufacture, it is important that the stabilized polymer have minimum discoloration.

Various methods for stabilizing these polymers have met with varying degrees of success, and many attempts have been made to find improved methods for stabilizing these polymers.

I have discovered that olefin polymers can be stabilized against melt flow drop off at elevated temperatures by admixing the polymer with very small amounts of elementary iodine, chlorine or bromine. I have discovered that very small amounts of these halogens, when reacted with the polymer, are quite effective in decreasing the melt flow drop off with substantially no effect on the physical properties of the stabilized polymer. I have also discovered that melt flow stability of these polymers can be obtained without inducing any undesirable discoloration to the polymer. The processability of these stabilized polymers is also improved by this invention.

Accordingly, an object of this invention is to provide an improved method for stabilizing olefin polymers against melt flow drop off during hot processing. Another object of this invention is to provide an improved method for stabilizing olefin polymers against melt flow drop off with little discoloration to the stabilized polymer. A further object of this invention is to provide an olefin polymer composition capable of being hot processed with little or no decrease in melt flow.

Other objects, aspects and advantages of my invention will become apparent to one skilled in the art from the following disclosure and claims.

In my invention, olefin polymers are stabilized to minimize melt flow drop off at elevated temperatures by admixing the polymer with 0.004 to 0.5 weight percent of elementary iodine, chlorine or bromine, based on the total weight of the polymer and the stabilizing additive.

When minimum discoloration of the stabilized polymer is desired, lesser amounts of stabilizing additive can be added to the polymer. Higher concentrations of stabilizing additive are satisfactory for minimizing melt flow drop off. When the stabilizing additive is a liquid, the additive and polymer are mxed thoroughly, e.g., by shaking in a vessel.

The stabilizing additives can be added to the polymer by any suitable means which effects a homogeneous distribution of the additive in the polymer. The stabilizing additive can be mixed with the polymer in any particulate form, such as granular, pellet, powder, or fluff, by mechanical mixing techniques such as blending, milling or kneading with devices such as a Henschel mixer, a Banbury mixer, a Brabender Plastograph, a Waring Blendor, a roll mill and the like.

Iodine or bromine can also be dissolved in inert solvents such as chloroform, carbon tetrachloride, hydrocarbons such as pentane, hexane, heptane, Stoddards solvent or mixtures of hydrocarbons, benzene, toluene and the like, and mixing the polymer with the resultant solution. The solvent can be subsequently removed by heating, purging with air, or the like. Chlorine gas or liquid bromine can also be used. When chlorine is the stabilizing additive, the reaction temperature should be in a range of room temperature to 120° C., preferably 80 to 100° C.

The stabilizing additives can be effectively employed in olefin polymers which are subject to melt flow drop off. The term "polymer" as herein used designates either homopolymers, copolymers or blends thereof. This invention is especially effective with polymers of 1-olefins having 2 to 8 carbon atoms per molecule. Specific examples of homopolymers are homopolymers of ethylene, propylene, butene-1, pentene-1, 4-methyl-pentene-1, hexene-1, heptene-1, octene-1 and the like. Specific examples of copolymers are copolymers of ethylene and propylene, of ethylene and butene-1, of propylene and butene-1, ethylene and hexene-1, propylene and octene-1, ethylene and 4-methylpentene-1, ethylene and octene-1, hexene-1 and octene-1 and the like.

The olefin polymers capable of being stabilized in accordance with this invention can be made by any of the various known polymerization processes. For example, polymers prepared by the polymerization process described in U.S. Pat. 2,825,721, Hogan et al. (1958), and British Pat. 853,414, Phillips Petroleum Company (1960), can be stabilized with the additives of this invention. Polymers made by the high pressure process or with organometal catalyst systems are examples of other polymers that can also be used. The polymer to be stabilized can contain other additives such as stress-cracking inhibitors, antioxidants, fillers, pigments, cross-linking agents, plasticizers, and the like. The stabilizing additives of this invention are effective with or without these other additives.

The advantages of my invention are further illustrated by the following examples. The reactants, proportions and other specific conditions are presented as being typical and should not be construed to limit the invention unduly.

EXAMPLE I

Samples were prepared from polyethylene made by the particleform process of British Pat. 853,414 using a chromium oxide-containing catalyst. The polymer had a melt index of 0.07 dg./min. (ASTM D 1238–62T, Condition E) and a density of 0.96 g./cc. (ASTM D 1505–63T). The polymer fluff was slurried with a solution of iodine in normal hexane for about 3 minutes in a stirred container. The solvent was allowed to evaporate and the fluff was blended for 3 minutes on a Brabender Plastograph. The melt flow drop off was determined by measuring the amount of polymer extruded through the orifice of the melt indexer at 550° F. during consecutive 5-minute intervals, using a piston load of 2200 grams. One sample with no iodine additive was used as a control. The results are shown in Table I.

TABLE I

| Concentration of iodine, wt. percent | Color | Weight of polymer extruded, grams, for indicated time, interval, min. | | | | | Percent decrease in melt flow between 5 and 25 minutes |
|---|---|---|---|---|---|---|---|
| | | 0.5 | 5–10 | 10–15 | 15–20 | 20–25 | |
| 0 (control) | White | 0.08 | 0.04 | 0.03 | 0.03 | 0.03 | 62.5 |
| 0.025 | Slightly pink [1] | 0.27 | 0.24 | 0.25 | 0.25 | 0.25 | 7.4 |
| 0.05 | do.[1] | 0.40 | 0.36 | 0.36 | 0.36 | 0.36 | 10.0 |

[1] The slight pink coloration disappeared after a few days storage without changing the stability provided by the process.

The data show that very small amounts of iodine treatment substantially improves melt flow drop off in the polymer.

EXAMPLE II

Polyethylene samples were prepared as in Example I. The polymer fluff was mixed with elementary solid iodine in a closed container on a drum roller for 1 to 2 hours. The melt flow drop off was determined on pellets extruded at 500° F. as in Example I. One sample with no iodine was used as a control. The results are shown in Table II.

TABLE II

| Concentration of iodine, wt. percent | Color | Weight of polymer extruded, grams, for indicated time, interval, min. | | | | | Percent decrease in melt flow between 5 and 25 minutes |
|---|---|---|---|---|---|---|---|
| | | 0.5 | 5–10 | 10–15 | 15–20 | 20–25 | |
| 0 (control) | White | 0.08 | 0.04 | 0.03 | ([1]) | ([1]) | 62.5 |
| 0.004 | do | 0.27 | 0.23 | 0.23 | 0.24 | 0.24 | 11.0 |
| 0.007 | do | 0.34 | 0.30 | 0.30 | 0.30 | 0.30 | 11.8 |

[1] Data was not collected after this point as the test was terminated after 15 minutes.

As in Example I, a very small amount of iodine substantially improves melt flow drop off in the polymer.

EXAMPLE III

Polyethylene samples were prepared as in Example I. The polymer was placed in a glass container followed by the addition of liquid bromine. After thorough shaking and evaporation of any liquid, the reaction mixture was allowed to stand overnight. The melt flow drop off was determined on pellets extruded at 550° F. as in Example I. One sample with no bromine was used as a control. The results are shown in Table III.

TABLE III

| Concentration of bromine, wt. percent | Weight of polymer extruded, grams, for indicated time interval, min. | | | | Percent decrease in melt flow between 5 and 25 minutes |
|---|---|---|---|---|---|
| | 0–5 | 5–10 | 10–15 | 15–20 | |
| 0 | 0.15 | 0.07 | 0.06 | 0.04 | 73.3 |
| 0.006 | 0.15 | 0.10 | 0.10 | 0.10 | 33.3 |
| 0.009 | 0.15 | 0.11 | 0.10 | 0.10 | 33.3 |
| 0.012 | 0.20 | 0.13 | 0.14 | 0.14 | 30.0 |
| 0.023 | 0.20 | 0.13 | 0.15 | 0.13 | 35.0 |
| 0.046 | 0.30 | 0.25 | 0.24 | 0.24 | 20.0 |

As in the first two examples, a treatment with a very small amount of halogen, in this case bromine, minimizes melt flow drop off.

EXAMPLE IV

Polyethylene samples were prepared by metering a known amount of chlorine gas into a stoppered bottle containing the polymer at a reaction temperature of 95° C. The polymer was plastographed for 3 minutes at 190° C. The melt flow drop off was determined as in Example I. One sample with no chlorine was used as a control. The results are shown in Table IV.

TABLE IV

| Concentration of bromine, wt. percent | Weight of polymer extruded, grams, for indicated time interval, min. | | | | Percent decrease in melt flow between 5 and 25 minutes |
|---|---|---|---|---|---|
| | 0–5 | 5–10 | 10–15 | 15–20 | |
| 0 | 0.17 | 0.09 | 0.09 | 0.09 | 47.0 |
| 0.013 | 0.28 | 0.25 | 0.24 | 0.23 | 17.8 |
| 0.032 | 0.35 | 0.28 | 9.29 | 0.28 | 20.0 |
| 0.064 | 0.46 | 0.42 | 9.39 | 0.36 | 21.7 |
| 0.13 | 0.45 | 0.48 | 0.48 | 0.46 | |

Improved results in the melt flow drop off were also achieved by treating the polymer with a very small amount of chlorine.

I claim:

1. A composition stabilized against melt flow drop off at elevated temperatures comprising a blend of polymer of a 1-olefin having 2 to 8 carbon atoms per molecule with 0.004 to 0.5 weight percent of halogen, except fluorine, based on the total weight of said polymer and said halogen.

2. The composition of claim 1 wherein said halogen is elementary iodine.

3. The composition of claim 1 wherein said polymer is a polymer of ethylene or propylene.

4. The composition of claim 3 wherein said polymer is polyethylene.

References Cited

UNITED STATES PATENTS

| | | | |
|---|---|---|---|
| 2,449,970 | 9/1948 | Borglin | 260—80 |
| 2,955,099 | 10/1960 | Mallouk et al. | 260—45.7 |
| 3,134,747 | 5/1964 | Amos et al. | 260—45.7 |
| 3,223,664 | 12/1965 | Conlon | 260—29.1 |
| 3,372,140 | 3/1968 | Witt | 260—45.9 |

DONALD E. CZAJA, Primary Examiner

R. A. WHITE, Assistant Examiner

U.S. Cl. X.R.

260—94.9